United States Patent Office 3,340,044
Patented Sept. 5, 1967

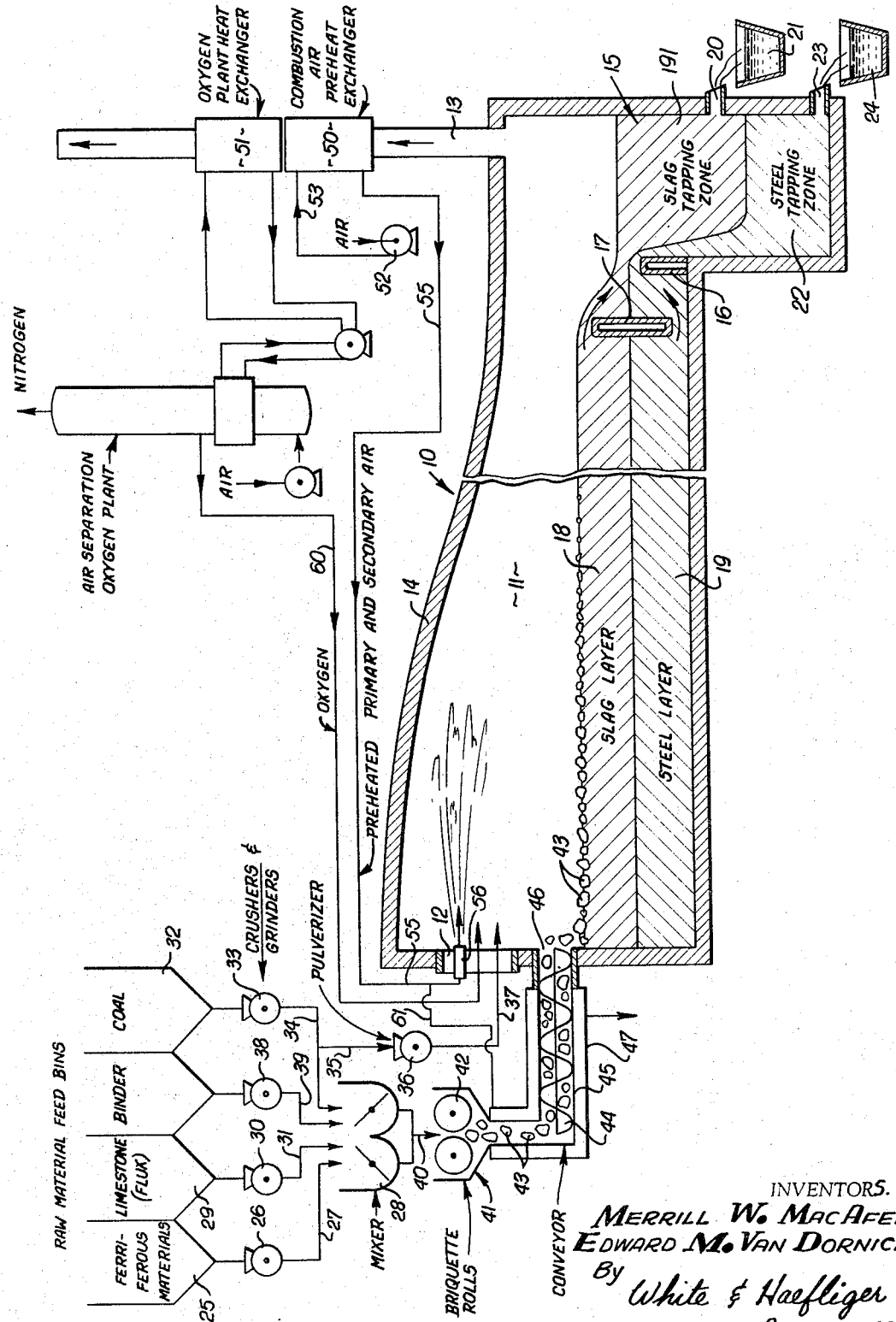

3,340,044
FURNACE REDUCTION OF PELLETIZED FERRIFEROUS MATERIALS
Merrill W. MacAfee, Huntington Park, Calif., and Edward M. Van Dornick, 3716 E. Corta Calle, Pasadena, Calif. 91107, Isabel W. MacAfee, executrix of the estate of said Merrill W. MacAfee, deceased, assignor to said Van Dornick
Filed May 11, 1964, Ser. No. 366,462
14 Claims. (Cl. 75—40)

This invention relates to an improved process for the reduction of ferriferous materials to obtain by a relatively simple and brief sequence of operating conditions and effects, ferrous products notably, but not necessarily exclusively, in the category of high quality steels resulting directly from the properties given the iron product as a consequence of the manner and conditions according to which its ores the ferriferous materials are reduced and the iron is recovered essentially as such. With respect to terminology, "essentially" iron products are understood to be inclusive of steels or alloys typically analyzing in excess of 95% iron but with carbon or other metals present, depending upon the end products desired and also the composition of particular materials reduced.

Preliminarily it may be observed that the invention is capable of producing by direct carbonaceous reduction, ferrous or ferro products from a broad range of natural and synthetic chemically bound iron compounds such as for instance, iron ores, iron minerals, iron containing slags, the red mud byproduct from the Bayer process production of alumina, mill scales, black sands and other iron containing industrial byproducts and wastes, which collectively we term ferriferous materials.

Where it is desired to produce high quality steel as the direct or immediate product, the invention presents outstanding advantages over and in contrast with conventional steel making processes requiring according to their particular types and objectives, furnace ore reduction or conversion of iron to steel, over many hours of operation, whereas the present invention provides for direct reduction of the ferriferous material content of the ore, and recovery of the iron as steel, well within a period of one hour.

The invention is predicated upon one objective, among others, of subjecting ground ferriferous material to treatment under conditions such that its total ferriferous material content is subjected to high temperature reaction and reduction in intimate and maintained admixture with reducing agent so that the desired reduction may proceed quickly and thoroughly to liberate particulate molten iron under conditions of coalescence such that the recovered iron product is given properties, apparently because of freedom from contamination, that qualify the product as steel. Where, as will appear, the desired immediate product may not be of steel quality, as in the case of so-called "Luppen," commercially known as a low-quality grade of lump, crude pig iron or steel which is intended for subsequent refining as in an open hearth or electric furnace, the invention nevertheless presents many advantages over known methods for producing such steel intermediaries, in the directness, simplicity and speed with which the reduction occurs to liberate iron into an other than steel composition or complex.

The invention is particularly predicated upon initially placing ground ferriferous material in a form of physical compacted admixture with carbonaceous reducing agent, and also ordinarily with appropriate fluxing agent, for unique relation to radiant and molten slag heating media and within which the reduction and freed iron particle separations occur. In accordance with the invention, ground iron ore together with reducing agent, and also fluxing material when required, are agglomerated in the form of what we term pellets, contemplating that the latter are to be in lump form with any of various possible shapes such as briquettes, cylindrical extrusions or other forms resulting from the use of available pelletizing, compacting, briquetting or extrusion eqipment. Our primary concern is that the pellets be of such size and shape, and have such compaction of their components, as to maintain the ferriferous material particles in an intimacy of contact with the reducing agent that will assure reduction of the ferriferous material through its oxide stages to particulate iron, quickly and directly within and at the high temperature of the radiant and molten slag heating media.

Related significantly to the prepared form and composition of the pellets are the high temperature media within which they are quickly heated to reaction and reduction temperatures so that the reduction occurs rapidly to the formation of molten iron particles or droplets which exude out of the pellets while the latter undergo progressive size reduction and ultimate conversion to molten slag and separable iron. For this purpose we maintain within an elongated furnace zone an upper molten slag layer and, where iron separation is to occur within the zone, a bottom molten iron or steel layer, and the pelletized feed is introduced to the slag layer to have buoyant flotation thereon, providing for efficient radiant and melt-to-solid heat transfer. Unlike the customary lower temperature reduction processes, the furnace is internally fired to maintain the slag layer at unusually high temperature, preferably within the range of about 3000° F. to 3400° F., so as to assure the desired reduction of the ferriferous material with rapid continuity through the successive stages to freed iron particles. For direct steel production, the density and viscosity of the slag layer may be controlled by proper fluxing to allow the iron droplets to settle through the slag layer to the steel layer below, thus effecting immediate removal of the particulate iron from what otherwise might be contaminating influences in the slag or gases being generated by the reduction and combustion, with the apparent result that iron contamination is so reduced as to impart to the steel product high quality properties.

In order to achieve the desired high radiation and slag layer temperatures, provision may be made for oxygen supplementation of the fuel mixture with which the furnace zone is fired. For this purpose we may practicably operate in conjunction with the furnace an oxygen plant for the recovery of oxygen by utilizing waste heat from the furnace combustion gases, and circulate to the firing atmosphere within the furnace, sufficient oxygen to maintain necessarily high flame temperatures which ordinarily will be in excess of 3500° F.

Further in the interest of maintaining high thermal efficiency at the furnace operating temperature level, provision also is made for exchanging burner feed air with the hot furnace combustion gases, thus economically to contribute to high flame temperatures. And as will appear, if desired, further heat recoveries may be promoted by preheating of the pellets by combustion gas-derived heat.

All the various features and objects of the invention, as well as the details of an illustrative embodiment, will be more fully understood from the following detailed description of the accompanying drawing wherein the system is shown in essentially diagrammatic and flow sheet form.

In reference first to the furnace generally indicated at 10, the latter may be constructed with appropriate refractory walls and in elongated form such that the combustion chamber 11 may in a typical commercial instance extend 30 to 60 feet between its inlet 12 and the combustion gas flue or outlet 13. The top wall 14 of the furnace is shown to converge to an outlet and separation sump 15 beyond overflow weir 16 and a layer separation baffle 17, both running transversely across the furnace interior.

The pelletized ferriferous material fed into the furnace as later explained, converts to an upper slag layer 18 and a lower iron or steel layer 19, the former flowing over baffle 17 into zone 191 from which the slag is continuously or intermittently withdrawn through outlet 20 into ladle 21 or other disposal; steel layer 19 under flowing baffle 17 and overflowing weir 16 to accumulate in zone 22 from which the iron or steel is withdrawn intermittently or continuously through outlet 23 into ladle 24 or other receptacle.

The ferriferous material fed to the system typically from bin 25 may vary widely in grade, ranging from a low grade of say 23% iron content, to high grade ores or other ferriferous material sources such as Jamaica red mud at 23% and ranging as high as Quebeck magnetite or mill scale at 65 to 70% iron content. In crusher 26 the material is reduced to particle size preferably in the −10 to +100 mesh range, and passes through line 27 to a suitable mixer diagrammatically indicated at 28.

Into the mixer may also be introduced suitable fluxing material which may be of any known type of composition capable of fluxing fusion of the slag to form layer 18 in the furnace. Preferred because of their low cost availability, are such fluxing agents as limestone, dolomite, fluorspar and glass cullet such as calcium-containing ground bottle glass. From source 29 the fluxing material passes through grinder 30 for fineness reduction comparable with the crushed ore, and then is discharged through line 31 to the mixer 28.

As reducing agent we employ suitable carbonaceous material such as coal, petroleum or coal coke, or natural bitumen fed from bin 32 through crusher 33 for delivery to the mixer 28 through line 34 at fineness at least as small as the ferriferous material particle size. Crushed coal or coke may also be fed as through line 35 to pulverizer 36 from which the carbonaceous powder is introduced through line 37 for combustion within the furnace zone 11. Oil or gas may also be used as combustion fuel.

In order to insure integrity of the pellets to be formed, we ordinarily will use also a binder material which may be either or both or organic of inorganic composition. Illustrative organic binders are tar, asphalt, resins, pulp mill wastes, waste polymers, molasses, starches, coal tar and native bitumens. Typical inorganic binders are kaolin clay, montmorillonite, slags, Portland cement, lime, fuller's earth, water softener residues, magnesium oxy chloride. When required, the binder material may pass through a crusher or grinder 38 and introduced through line 39 to the mixer 28 wherein the described pellet components are thoroughly and uniformly admixed for delivery at 40 to suitable pelletizing means generally indicated at 41.

Typically the prepared admixture may be converted to pellets in lump or briquette form by passage between briquetting rolls 42 which compact the materials into bodies of suitable size and volume, e.g. in the range of about 0.5 to 50 cubic inches. The briquettes 43 then pass to screw conveyor 44 operating within casing 45 to discharge the pellets at 46 into the slag layer 18. If desired, the pellets may be preheated as by hot air circulated through the conveyor casing jacket 47 as later explained.

By pellet density control and controlled fluxing where necessary, the density of the pellet and density and viscosity of the slag layers, 18, may be so maintained as to cause pellets, 43, to float with partial submergence in the molten slag. Upon entering the 3000 to 3400° F. slag and radiant heat zone the pellets undergo rapid heating with proportionately rapid reaction reduction of their ferriferous material content made possible by the combination of high temperature heating and intimate and uniform contact of the crushed ferriferous material particles with the carbonaceous reducing agent. Rapidity and uniformity of fluxing also results from the high slag and radiant temperature and intimacy and uniformity of distribution of the fluxing agent throughout the pellets. The latter are carried by and in the slag as it flows through the furnace, and during the course of their travel the pellets progressively reduce in size in a manner that may be somewhat similar to exfoliation or ablation, to the extent of complete disintegration and fusion before arrival at the tapping zones. An observed effect upon the upper exposed surface of the pellets is the formation or exudation from the pellet surface of small iron droplets or beads which separate from the pellet and pass into the slag layer. Where the object of the process is direct steel production, the pellet density is adjusted and the slag layer is fluxed to density allowing floating partial submergence of the pellets, and with viscosity sufficiently low that the higher density iron droplets will promptly settle into and coalesce within the bottom layer 19 upon separation of the particulate iron from the pellets.

As previously indicated, the process may also be used for the production of so-called "Luppen," being a low quality grade of crude iron or steel wherein the iron or steel droplets are permitted to remain within the slag. For such purposes, fluxing of the slag may be eliminated or reduced to maintain a slag viscosity sufficiently high that the iron particles will remain dispersed throughout the slag and the furnace product effluent will consist of such slag-iron which may be cooled and crushed and the iron recovered for further treatment by known commercial methods for the production of steel.

Otherwise, and for our major steel production purposes, the slag and steel layers are accumulated in and separately withdrawn from the tapping zones 191 and 22 as previously indicated.

For purposes of preheating the furnace combustion air, and to provide oxygen supplementation, the furnace hot combustion gases removed through outlet 13 may be passed successively through one or more air preheaters 50 and one or more oxygen plant heat exchangers 51. Furnace burner air is shown to be discharged by blower 52 through line 53 and in indirect heat exchange with the combustion gases in exchanger 50, the preheated air then being discharged through line 55 for use as primary and secondary air to suitable burners diagrammatically indicated at 56. The oxygen plant heat exchangers 51 supply the heat and energy necessary for the operation of a conventional air separation plant producing the oxygen desired for fuel supplementation and other uses. The oxygen produced is discharged through line 60 directly or indirectly into the furnace fuel combustion or flame zone, by being fed either to appropriate burners 56 or directly into the combustion atmosphere. Where preheating of the pellets is desired, a portion of the line 55 air stream may be taken through line 61 for passage through the conveyor casing jacket 47.

In further reference to various ores which we have successfully reduced in accordance with the invention to the production of high tensile strength steels, the following may be cited as illustrative: New Mexico Iron Mountain Magnetite Concentrate, Jamaica Bauxite Red Mud, East Tennessee, Limonite, New Caledonia Nickel Saprolite, Columbia Nickel Laterite, Arizona Hematite, Anaconda Copper Reverb. Slag, Quebec Magnetite and Spokane Chrome Electric Smelter Slag.

At this point it may be observed that the carbonaceous reducing agent content of the pellets will of course be dependent upon the ferriferous material to be reduced, but will be in excess say by 25% to 100% of the stoichiometric amount of carbon theoretically required. Binder content may vary e.g. between 5 and 25% weight percent, depending upon the binder, and the fluxing agent may vary from none to as high as 50%, depending on the ferriferous material and the desired slag properties.

The following are examples showing typical ferriferous material analyses, pellet compositions and product analyses and recoveries, with reaction or slag temperatures in each instance:

EXAMPLE I.—Quebec magnetite ore

| Ore | Steel Product |
|---|---|
| Hardness | Rockwell F99 |
| Tensile (based on Hardness) | 70,000 |
| Fe, 65.4 | 99+ |
| Si, 1.5 | 0.031 |
| Al, .65 | 0.05 |
| C | 0.11 |
| Cr | 0.01 |
| Ni | 0.075 |
| V | 0.02 |
| Mn | 0.10 |
| Cu | 0.36 |
| Mo | 0.012 |
| Ti | 0.10 |
| Cb | 0.005 |
| Co | 0.05 |
| Mg, 0.05 | ----- |
| Ca, 0.4 | ----- |

| Pellet Mix | Grams | Percent | Steel Recovery, 94% |
|---|---|---|---|
| Ore | 250 | 66.6 | |
| Cullett | 50 | [1] 13.4 | Reaction temp., 3,200 F. (slag temp.) |
| Coal | 50 | 13.4 | |
| Tar | 25 | 6.6 | |
| | 375 | 100.0 | |

[1] Bottle glass.

EXAMPLE II.—East Tennessee limonitic ore

| Ore | Steel Product |
|---|---|
| Hardness (Rockwell scale) | RC56 |
| Tensile (based on Hardness) | 300,000 |
| Fe, 25.5 | 95+ |
| Si, 25.5 | 2.0 |
| Al, 5.29 | ----- |
| C, 0.0 | 1.15 |
| Cu, Tr | 0.14 |
| Co, Tr | ----- |
| Mg, 0.11 | ----- |
| As, 0.0 | ----- |
| B, 0.0066 | ----- |
| Ti, 0.27 | ----- |
| Mn, 0.23 | 0.75 |
| Gd, Tr | ----- |
| Cr, 0.0048 | ----- |
| Ni, 0.0044 | 0.80 |
| Mo, 0 | 0.05 |
| V, 0.19 | 0.03 |
| Ag, 0 | ----- |
| Nd, 0 | ----- |
| Zr, 0.048 | ----- |
| Co, 0.0018 | ----- |
| K, 0 | ----- |
| W, 0 | ----- |
| Sr, Tr | ----- |
| P, 0.129 | 0.015 |
| S, 0.015 (Sin coal 1.38) | 0.021 |

| Pellet Mix | Grams | Percent | Steel Recovery, 99% |
|---|---|---|---|
| Ore | 200 | 41.6 | |
| Limestone | 140 | 29.1 | Reaction emp., 3,280 F. (slag temp.) |
| Coal | 80 | 16.7 | |
| Tar | 60 | 12.6 | |
| | 480 | 100.0 | |

EXAMPLE III.—Jamaica Bayer process red mud

| Ferriferous Material | Product |
|---|---|
| Hardness (Rockwell scale) | C42 |
| Tensile (based on Hardness) | 195,000 |
| Fe, 23.0 | 94± |
| Mo | 0.12 |
| Mn | 0.67 |
| Si | 3.00 |
| C | 1.77 |
| Cu | 0.14 |
| Cr | 0.13 |
| Ni | 0.13 |
| V | 0.05 |
| Ti | None |
| Al | None |

| Pellet Mix | Grams | Percent | Steel Recovery, 96.75% |
|---|---|---|---|
| Ore | 150 | 58.8 | |
| Flux | none | [1] | Reaction temp., 3,100 F. (slag temp.) |
| Coal | 60 | 23.5 | |
| Tar | 45 | 17.7 | |
| | 255 | 100.0 | |

[1] Self-fluxing.

As will be observed from the foregoing examples, we have achieved in product steels especially high tensile strengths, based on hardness, ranging from 70,000 p.s.i. upwards of 300,000 p.s.i. While all reasons for such high strengths are not fully known, the explanation at least in part may be attributable to the fact that immediately upon their formation out of pellets, the steel beads form and are immediately submerged in the slag. Thereafter the beads are promptly coalesced into the underlayer, with minimized opportunity for absorption by the droplets of gaseous impurities, by reason of the high surface tension of the droplets and their brief exposure to gaseous impurities. The reasons may also be related to the very rapid transition of the ferreferous material into reduced iron and subsequently coalesced steel melt, together with minimized exposure to impurities.

We claim:

1. The process of obtaining a ferrous product resulting from reaction and reduction of ferriferous materials, that includes maintaining in an elongated stationarily walled high temperature furnace zone a molten horizontal slag layer at a temperature in the range of about 3000° F. to 4000° F., flowing the slag layer horizontally out of said zone, introducing to and floating within said slag layer pelletized bodies of ground ferriferous slag forming material admixed with carbonaceous reducing material, maintaining said bodies floating in and flowing with the slag layer throughout a distance so extended as to allow for reduction of the ferriferous material, fusion and substantially complete disintegration of the pellets, thereby causing molten iron particles to form and exude out of said bodies into the molten slag while the bodies progressively reduce in size, settling the iron particles from and coalescing the iron particles below the slag layer, and flowing the coalesced iron from said furnace zone.

2. The process of obtaining an essentially iron product from ferriferous material, that includes maintaining in a stationarily walled elongated high temperature furnace zone an upper horizontal molten slag layer at a temperature in the range of about 3000° F. to 3400° F. and a bottom molten iron layer underlying the slag layer, introducing to a feed end of said zone and floating within said slag layer pelletized bodies of ground ferriferous slag forming material admixed with carbonaceous reducing material, internally firing said zone at said feed end thereof, maintaining said bodies floating in and flowing with the slag layer throughout a distance so extended as to allow for reduction of the ferriferous material, fusion and substantially complete disintegration of the pellets, thereby causing molten iron particles to form and exude out of said bodies while they progressively reduce in size and the iron particles settle and accumulate into said molten iron layer, flowing said layers cocurrently with combustion gases from said firing toward an outlet end of said zone, and removing and separately recovering slag and iron from said slag and iron layers.

3. The process of claim 2, in which said bodies contain also ground fluxing and binding agents.

4. The process of claim 2, in which the non-ferrous content of the slag layer is substantially totally derived from said pelletized bodies.

5. The process of claim 2, in which said removed iron layer is solidified and as such constitutes high quality carbon-containing steel.

6. The process of claim 2, in which said zone is internally fired above the slag layer and air is preheated by exchange with combustion gases removed from said zone and is introduced with fuel to the zone for said firing.

7. The process of obtaining an essentially iron product from ferriferous material, that includes maintaining in an elongated high temperature furnace zone an upper molten slag layer and a bottom molten iron layer, introducing to and floating within said slag layer pelletized bodies of ground ferriferous material admixed with carbonaceous reducing material, thereby causing molten iron particles to form and exude out of said bodies while they progressively reduce in size and the iron particles settle into said molten iron layer, flowing said layers toward an outlet end of said zone, removing and separately recovering said slag and iron layers, producing oxygen by utilizing waste heat recovered from the combustion gases removed from the chamber, and introducing the oxygen so produced to the firing atmosphere in said zone.

8. The process of claim 7, in which air is preheated by exchange with said combustion gases and is introduced with fuel to the furnace zone for said firing.

9. The process of claim 8, in which said slag layer is maintained at a temperature between about 3000° F. and 3400° F.

10. The process of claim 9, in which said zone is fired at the pellet feed inlet end thereof to produce combustion gases flowing longitudinally therein to the outlet end extent of the zone, and said pelletized bodies progressively reduce in size to substantially complete disintegration in flowing in the slag layer toward said outlet end of the zone.

11. The process of obtaining a ferrous product resulting from reaction and reduction of ferriferous materials, that includes maintaining in an elongated stationarily walled high temperature furnace zone a molten horizontal slag layer, flowing the slag layer horizontally out of said zone, introducing to and floating within said slag layer pelletized bodies of ground ferriferous slag forming material admixed with carbonaceous reducing material, maintaining said bodies floating in and flowing with the slag layer throughout a distance so extended as to allow for reduction of the ferriferous material, fusion and substantially complete disintegration of the pellets, thereby causing molten iron particles to form and exude out of said bodies into the molten slag while the bodies progressively reduce in size, settling the iron particles from and coalescing the iron particles below the slag layer, and flowing the coalesced iron from said furnace zone, the relative densities of said bodies and slag layer being such that said bodies remain at the surface of the slag layer while undergoing radiant and slag heating, reaction and reduction.

12. The process of claim 11, in which said slag layer is maintained at a temperature in the range of about 3000° F. to 3400° F.

13. The process of claim 11, in which said bodies contain also a binding agent and a fluxing agent.

14. The process of obtaining a ferrous product resulting from reaction and reduction of ferriferous materials, that includes maintaining in an elongated stationarily walled high temperature furnace zone a molten horizontal slag layer, flowing the slag layer horizontally out of said zone, introducing to and floating within said slag layer pelletized bodies of ground ferriferous slag forming material admixed with carbonaceous reducing material, maintaining said bodies floating in and flowing with the slag layer throughout a distance so extended as to allow for reduction of the ferriferous material, fusion and substantially complete disintegration of the pellets, thereby causing molten iron particles to form and exude out of said bodies into the molten slag while the bodies progressively reduce in size, settling the iron particles from and coalescing the iron particles below the slag layer, and flowing the coalesced iron from said furnace zone, the non-ferrous content of the slag layer being substantially totally derived from said pelletized bodies.

References Cited

UNITED STATES PATENTS

| 1,320,483 | 11/1919 | Lund | 75—40 |
| 2,557,650 | 6/1951 | Gilliland | 75—40 |
| 2,602,735 | 7/1952 | Howard | 75—40 |

FOREIGN PATENTS

| 474,408 | 11/1937 | Great Britain. |
| 740,492 | 11/1955 | Great Britain. |

DAVID L. RECK, *Primary Examiner.*

HYLAND BIZOT, *Examiner.*

H. W. TARRING, *Assistant Examiner.*